United States Patent
Lapointe (10) Patent No.: US 9,603,469 B2
(45) Date of Patent: Mar. 28, 2017

(54) APPARATUSES AND KITS FOR DISPLAYING ITEMS

(71) Applicant: Roch Lapointe, Bury (CA)

(72) Inventor: Roch Lapointe, Bury (CA)

(*) Notice: Subject to any disclaimer, the term of this patent is extended or adjusted under 35 U.S.C. 154(b) by 0 days.

(21) Appl. No.: 15/094,006

(22) Filed: Apr. 8, 2016

(65) Prior Publication Data

US 2016/0360901 A1 Dec. 15, 2016

(30) Foreign Application Priority Data

Jun. 12, 2015 (CA) ..................................... 2894327

(51) Int. Cl.
*A47F 7/00* (2006.01)
*A47F 5/04* (2006.01)
*A47F 5/10* (2006.01)

(52) U.S. Cl.
CPC .............. *A47F 7/0078* (2013.01); *A47F 5/04* (2013.01); *A47F 5/10* (2013.01)

(58) Field of Classification Search
CPC ........ A47G 7/041; A47G 7/042; A47G 7/044; A47G 25/0664; A47G 25/0671; A47F 5/04; A47F 5/05; A47F 5/06; A47F 5/08; A47F 5/0807; A47F 5/0876; A47F 7/0078; A47F 7/06; A47F 5/10; A01G 9/023; A47B 96/1416; A47B 96/1425; A47B 96/14
USPC .......................................... 211/85.23; 47/39
See application file for complete search history.

(56) References Cited

U.S. PATENT DOCUMENTS

| | | | | |
|---|---|---|---|---|
| 1,224,127 A | * | 5/1917 | Bartlett ................ | A47B 96/061 108/152 |
| 3,018,898 A | * | 1/1962 | Frazelle ............ | A47B 96/1425 211/107 |
| 3,310,180 A | | 3/1967 | Neagle | |
| 3,524,616 A | * | 8/1970 | Marschak ............ | A47B 57/425 211/205 |
| 3,771,665 A | * | 11/1973 | Potter ...................... | A47J 47/16 211/107 |
| 3,991,686 A | * | 11/1976 | Mechachonis ............ | A47F 5/05 108/103 |

(Continued)

FOREIGN PATENT DOCUMENTS

| CA | 2730650 | 8/2012 |
|---|---|---|
| CA | 2822985 | 2/2015 |

OTHER PUBLICATIONS

English Abstract of CN2049495(U), "Folding Type Multi-Purpose Supporter for Mosquito Net", published on Dec. 20, 1989.
English Abstract of CN201097532(Y), "Tower shape rack (a new viticultural rack)", published on Aug. 13, 2008.
English Abstract of CN202233462(U), "Three-Layer large-scale sunshake", published on May 30, 2012.

(Continued)

*Primary Examiner* — Patrick Hawn
(74) *Attorney, Agent, or Firm* — Bereskin & Parr LLP/S.E.N.C.R.L., s.r.l.

(57) ABSTRACT

A item-displaying apparatus and kit includes a post member having at least one opening formed in a sidewall thereof and at least one item-supporting frame. The frame includes a first branch member adapted to be inserted within the at least one opening, a second branch member having a item holder at its first portion and a linking member extending between the first branch member and the second branch member. When the first branch member is inserted into the at least one opening and a force is applied on the item holder, a second portion of the second branch member engages the sidewall of the post member.

13 Claims, 6 Drawing Sheets

(56) References Cited

U.S. PATENT DOCUMENTS

| | | | |
|---|---|---|---|
| 4,068,761 A | | 1/1978 | McCarthy |
| 4,101,036 A | * | 7/1978 | Craig .................. A47B 96/1425 |
| | | | 211/107 |
| D251,579 S | * | 4/1979 | Calgaro ........................ D6/566 |
| 4,232,790 A | * | 11/1980 | Serrano .............. G11B 33/0466 |
| | | | 211/163 |
| 4,770,303 A | | 9/1988 | Boyd |
| 4,991,344 A | | 2/1991 | Carney |
| 5,487,476 A | | 1/1996 | Barfield |
| 5,598,662 A | * | 2/1997 | Droste ................... A47G 7/041 |
| | | | 47/39 |
| 5,947,306 A | * | 9/1999 | Chang ................... A47G 7/044 |
| | | | 211/133.4 |
| 6,595,377 B1 | | 7/2003 | Hetu |
| 8,020,716 B2 | * | 9/2011 | Vitale ................... A47B 57/06 |
| | | | 211/197 |
| 2006/0124817 A1 | | 6/2006 | White |
| 2008/0197087 A1 | * | 8/2008 | Hunter ................ A47B 13/088 |
| | | | 211/1.53 |

OTHER PUBLICATIONS

English Abstract of CN202722115(U), "Assembled stereoscopic flowerpot", published on Feb. 13, 2013.
English Abstract of CN203313876(U), "Bird nest tree", published on Dec. 4, 2013.
English Abstract of CN203313877(U), "Bird nest frame", published on Dec. 4, 2013.
English Abstract of DE20313518(U1), "Plant protection device designed as concave transparent umbrella with central pole used as watering duct", published on Nov. 13, 2003.
English Abstract of JP2001020566(A), "Fence", published on Jan. 23, 2001.
Enblish Abstract of JPH11275966(A), "Flower Stand", published on Oct. 12, 1999.
English Abstract of KR20130071940(A), "Clothes Horse", published on Jul. 1, 2013.
English Abstract of KR20130089451(A), "Clothes Horse", published on Aug. 12, 2013.

* cited by examiner

APPARATUSES AND KITS FOR DISPLAYING ITEMS

CROSS-REFERENCE TO RELATED APPLICATIONS

The present application claims priority to Canadian Application No 2,894,327, that is hereby incorporated by reference in its entirety.

FIELD OF THE DISCLOSURE

The present disclosure relates to apparatuses and kits for displaying items, such as flower and plant pots.

BACKGROUND OF THE DISCLOSURE

In many fields, it may be desirable to display items in an attractive way.

For horticulturists, both professional and amateur, it is desirable to display the plants that they have grown. A pot display allows a plurality of flower and plant pots to be placed in vicinity of one another, thereby allowing for the creation of a visual pleasing display of flower and plants contained in the pots.

U.S. Pat. No. 3,018,898 describes a support having a portable bracket pole structure.

U.S. Pat. No. 4,068,761 describes An apparatus for supporting and displaying plants in a window, that is readily adaptable to windows of various sizes and provides not only relocatable supporting platforms for potted plants but also relocatable pegs from which hanging plants may be displayed.

U.S. Pat. No. 5,487,476 describes an ornamental tree flower pot display is comprised of an upper support pipe formed as a hollow cylinder with openings at both ends. The pipe also includes coupling means located adjacent to both ends. A lower support bar is formed as a hollow cylinder with openings at both ends. The lower support bar has a smaller diameter and length than the upper support pipe and includes coupling means located adjacent to both ends. A joint is formed in a hollow, generally cylindrical configuration and includes an upper region and a lower region with openings at both ends. The upper region has a larger diameter than the lower region. The openings at both ends of the joint include coupling means to permit releasable coupling with the upper support pipe and lower support bar. A multi-unit branch ring consists of a center piece formed in a hollow, generally cylindrical configuration with openings at both ends. The center piece includes coupling means to permit releasable coupling with the upper support pipe. The center piece also includes a plurality of branch holders affixed to its perimeter. A plurality of branches are each formed as an elongated member with ends adapted to be positioned in the branch holder and suspend objects therefrom.

U.S. Pat. No. 4,991,344 discloses a device for hanging plants, pots or the like. The apparatus is comprised of a hollow center post having modularly pieced components upon which is mounted radially extending arms and legs. A center hub is provided for mounting the radially extending arms and legs to said center post. The center post is adapted for being supported in its upright position by various type means for mounting on the floor, a tree dolly or for mounting directly into the earth.

U.S. Pat. No. 4,770,303 discloses a demountable stand for supporting hanging plants comprises an elongated cylindrical center post having a plurality of sets of circumferentially disposed support arms which extend radially outward therefrom to receive and support hanging plants. The support arms are square bar stock formed into an ornamental configuration. A plurality of sets of circumferentially spaced vertically disposed rectangular connectors having vertically extended square openings are attached circumferentially on the post at various locations along its length to slidably receive one end of the support arms. A bottom set of connectors and leg members provide a base for supporting the assembly in an upright position. Alternatively, straight support arms which extend perpendicular to the longitudinal axis of the post may be employed to support one or more horizontal support members for supporting additional potted plants or to provide a table.

U.S. publication no. 2006/0124817 discloses a support for supporting an object and of use with a vertically, upstanding member, the support comprising (i) a u-shaped member for operably embracing a portion of the upstanding member and having an elongate first arm and an elongate second arm, essentially parallel thereto, integrally formed one to the other at an interarm base portion, and defining an interarm distance and an interarm plane; and the first arm having a first arm terminal portion and the second arm having a second arm terminal portion; and wherein the interarm distance is such as to allow the u-shaped member to operably, suitably receive a portion of the vertically upstanding member, (ii) an elongate extension arm having (a) a first terminal portion integrally formed with and extending from the first arm at a joined portion thereof, whereby a downward force applied to the extension arm effects a turning motion on the joined portion and concomitant upward movement of the second arm; (b) a second terminal portion distal from the first terminal portion; and (c) an object retention means integral with the extension arm at or adjacent the second terminal portion. The object is preferably a flower pot and the upstanding member is a post or plank preferably of a fence. The support allows the ready positioning and/or removal of the flower pot adjacent the post or fence without the need for nails, screws, or other post damaging articles.

Chinese utility model no. CN203313877U discloses a bird nest frame which is composed of a nest frame, a stand column and a tripod, wherein the upper end of the stand column is connected with the nest frame, and the lower end of the stand column is connected with the tripod.

Chinese utility model no. CN202722115U discloses an assembled stereoscopic flowerpot comprising a base, a stand column body, branch bars, flower rack supports and flowerpot bodies. The stand column body is detachably arranged on the base. The branch bars are fixedly installed on the stand column body. The flower rack supports are respectively fixed on the branch bars. The flowerpot bodies are respectively arranged in the flower rack supports. The assembled stereoscopic flowerpot is strong in greening stereoscopic impression, mountable, detachable, and convenient to move, can be used of planting various flowers, plants and trees, and can meet the requirements of people for three-dimensional greening decoration.

SUMMARY

It would thus be highly desirable to be provided with an apparatus, system or method that would at least partially address the disadvantages of the existing technologies.

The embodiments described herein provide in one aspect an apparatus for displaying items, the apparatus comprising a post member having at least one opening formed in a sidewall thereof, at least one item supporting frame comprising a first branch member received within the at least one opening, a second branch member having a item holder at a first portion of the second branch, and a linking member extending between the first branch member and the second branch member, and wherein when a force is applied on the item holder, a second portion of the second branch member engages the sidewall of the post member.

The embodiments described herein provide in another aspect an item displaying kit comprising a post member having at least one opening formed in a sidewall thereof, at least one item supporting frame comprising a first branch member adapted to be inserted within the at least one opening, a second branch member having an item holder at a first portion of the second branch, and a linking member extending between the first branch member and the second branch member and wherein when the first branch member is inserted into the at least one opening and a force is applied on the item holder, a second portion of the second branch member engages the sidewall of the post member.

DRAWINGS

The following drawings represent non-limitative examples in which.

DESCRIPTION OF VARIOUS EMBODIMENTS

The following examples are presented in a non-limiting manner.

The word "a" or "an" when used in conjunction with the term "comprising" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The terms "coupled" or "coupling" as used herein can have several different meanings depending on the context in which these terms are used. For example, the terms coupled or coupling can have a mechanical or electrical connotation. For example, as used herein, the terms coupled or coupling can indicate that two elements or devices are directly connected to one another or connected to one another through one or more intermediate elements or devices via an electrical element, electrical signal or a mechanical element depending on the particular context.

The term "engages" as used herein when referring to the interaction between the second portion of the second branch member and the sidewall of the post member can refer to a frictional engagement. For example, it can refer to the second portion of the second branch member that abuts the sidewall of the post member. For example, it can refer to the second portion of the second branch member that abuts the exterior sidewall of the post member. For example, it can refer to the second portion of the second branch member that penetrates the sidewall of the post member. For example, it can refer to the second portion of the second branch member that is inserted into the post member. For example, the engagement can be a surface to surface contact between the second portion of the second branch member and the exterior sidewall of the post member.

According to example item-displaying apparatuses disclosed herein, the second portion of the second branch member abuts the sidewall of the post member to engage it.

According to example item-displaying apparatuses disclosed herein, the at least one opening comprises opposing openings in the sidewall and the at least one item supporting frame comprises a first item supporting frame inserted into a first of the opposing openings and second item supporting frame inserted into a second of the opposing openings.

According to example item-displaying apparatuses disclosed herein, the apparatus further includes a connector extending through the post member between the opposing openings and connecting the first item supporting frame and the second item supporting frame.

According to example item-displaying apparatuses disclosed herein, the first member is positioned at a height along the post member above a height of the item holder of the second branch member.

According to example item-displaying apparatuses disclosed herein, the first branch member is oriented substantially horizontally, the second branch member is oriented substantially horizontally, and the linking member is oriented substantially vertically.

According to example item-displaying apparatuses disclosed herein, the force applied on the item holder causes a dominantly horizontal force to be applied on the second branch member, thereby causing engagement of the second branch member with the sidewall of the post member.

According to example item-displaying apparatuses disclosed herein, the dominantly horizontal force on the second branch member causes frictional engagement of the second portion of the second branch member with the sidewall of the post member.

According to example item-displaying apparatuses disclosed herein, the item holder of the second branch member comprises an elbow joint having a vertically extending portion and a item holding plate supported by the vertically extending portion.

According to example item-displaying apparatuses disclosed herein, the at least one opening comprises a first opening formed at a first height along the post member and a second opening formed at a second height along the post member, the first height being different from the second height, and a post supporting frame is received in each of the first opening and the second opening.

According to example item-displaying apparatuses disclosed herein, the post member comprises a plurality of subsections connected end to end.

According to example item-displaying apparatuses disclosed herein, the at least one opening comprises a first opening formed at a first length along one of the subsections and a second opening formed at a second length along said one of the subsections, the first length being different from the second length and in a post supporting frame is received in each of the first opening and the second opening.

According to example item-displaying apparatuses disclosed herein, the first branch member, the second branch member and the linking member are integrally formed.

According to example item-displaying apparatuses disclosed herein, the first branch member, the second branch member and the linking member are glued together.

According to example item-displaying apparatuses disclosed herein, the post member, the first branch member and the second branch member are formed of non-metallic material.

According to example item-displaying apparatuses disclosed herein, the post member, the first branch member and the second branch member are formed of recycled material.

According to example item-displaying apparatuses disclosed herein, the post member, the first branch member and the second branch member are formed of building pipes.

According to example item-displaying apparatuses disclosed herein, the building pipes are formed of at least one of PVC, ABS, plastic, and metal.

According to example item-displaying apparatuses disclosed herein, the apparatus includes a base for supporting the post member in an upright position.

According to example item-displaying apparatuses disclosed herein, the apparatus is formed of at least 50% recycled material by weight based on the total weight of the item-displaying apparatus.

According to example item-displaying apparatuses disclosed herein, the apparatus is formed of at least 70% recycled material by weight based on the total weight of the item-displaying apparatus.

According to example item-displaying apparatuses disclosed herein, the apparatus is formed of at least 90% recycled material by weight based on the total weight of the item-displaying apparatus.

According to example item-displaying apparatuses disclosed herein, the post member and the supporting frame are coupled together using at least one of fastening, soldering, bonding and clipping.

According to example item-displaying apparatuses disclosed herein, the post member is coupled to the base member using at least one of fastening, soldering, bonding and clipping.

According to example item-displaying apparatuses disclosed herein, the building pipes are retooled using at least one of cutting, sawing, drilling and machining.

According to example item-displaying apparatuses disclosed herein, the apparatus further includes a bin coupled to the post member and extending angularly about the post member.

According to example item-displaying kits disclosed herein, the at least one opening comprises opposing openings in the sidewall and the at least one item supporting frame comprises a first item supporting frame adapted to be inserted into a first of the opposing openings and a second item supporting framed adapted to be inserted into a second of the opposing openings.

According to example item-displaying kits disclosed herein, the kit further includes a connector adapted to extend through the post member between the opposing openings and to connect the first item supporting frame the second item supporting frame.

According to example item-displaying kits disclosed herein, kit further includes a base adapted to support the post member in an upright position.

According to example item-displaying kits disclosed herein, when the post member is in the upright position and the at least one item supporting frame is inserted into the at least one opening, the first branch member is oriented substantially horizontally, the second branch member is oriented substantially horizontally and the linking member is oriented substantially vertically.

According to example item-displaying kits disclosed herein, when the post member is in the upright position and the at least one item supporting frame is inserted into the at least one opening, and a force is applied on the item holder, a dominantly horizontal force is applied onto the second branch member, thereby causing engagement of the second branch member with the sidewall of the post member.

According to example item-displaying kits disclosed herein, the post member comprises a plurality of subsections adapted to be connected end to end.

According to example item-displaying kits disclosed herein, the post member, the first branch member and the second branch member are formed of non-metallic material.

According to example item-displaying kits disclosed herein, the post member, the first branch member and the second branch member are formed of recycled material.

According to example item-displaying kits disclosed herein, the post member, the first branch member and the second branch member are formed of building pipes chosen from PVC, ABS, metal and plastic.

According to example item-displaying kits disclosed herein, the kit is formed of at least 50% recycled material by weight based on the total weight of the item-displaying kit.

According to example item-displaying kits disclosed herein, the kit is formed of at least 70% recycled material by weight based on the total weight of the item-displaying kit.

According to example item-displaying kits disclosed herein, the kit is formed of at least 90% recycled material by weight based on the total weight of the item-displaying kit.

According to example item-displaying kits disclosed herein, the building pipes are retooled using at least one of cutting, sawing, drilling and machining.

According to example item-displaying kits disclosed herein, the post member and the supporting frame are coupled together using at least one of fastening, soldering, bonding and clipping.

According to example item-displaying kits disclosed herein, the post member is coupled to the base member using at least one of fastening, soldering, bonding and clipping.

According to example item-displaying kits disclosed herein, an item-displaying apparatus assembled from the kit is variable in at least one of height and width.

According to example item-displaying kits disclosed herein, the post member further includes a bin adapted to be coupled to the post member 4 and to extend angularly about the post member.

According to example disclosed herein, there is provided a method of assembling an apparatus or a kit as described in the present disclosure, the method comprises coupling together the post member by using a manufacturing method (for example at least one of fastening, soldering, bonding and clipping).

According to example disclosed herein, the method of manufacturing comprises coupling the post member by using a manufacturing method (for example at least one of fastening, soldering, bonding and clipping).

According to example disclosed herein, the only means penetration of part of element 48 into the body of the poteau central, but also covers the possibility to have a simple frictional surface to surface contact between an end of the second branch 48 and the poteau central, the end of the second branch 48 being as represented in the Figures but having the possibility to be any adapted end of an extension of the first and or of the second branch.

According to example disclosed herein, the second portion of the second branch member engages the exterior of the sidewall of the post member.

According to example disclosed herein, the second portion of the second branch member engages solely the exterior of the sidewall of the post member.

According to example disclosed herein, the second portion of the second branch member abuts the exterior of the sidewall of the post member to engage it.

According to example disclosed herein, the second portion of the second branch member engages the sidewall of the post member and wherein engagement between the second portion of the second branch member and the sidewall of the post member consists essentially in the second branch member abutting the exterior of the sidewall of the post member to engage it.

According to example disclosed herein, the second portion of the second branch member engages the sidewall of the post member and wherein engagement between the second portion of the second branch member and the sidewall of the post member consists in the second branch member abutting the exterior of the sidewall of the post member to engage it According to example disclosed herein, the first portion is an end portion.

According to example disclosed herein, the second portion is an end portion.

Figure 1:
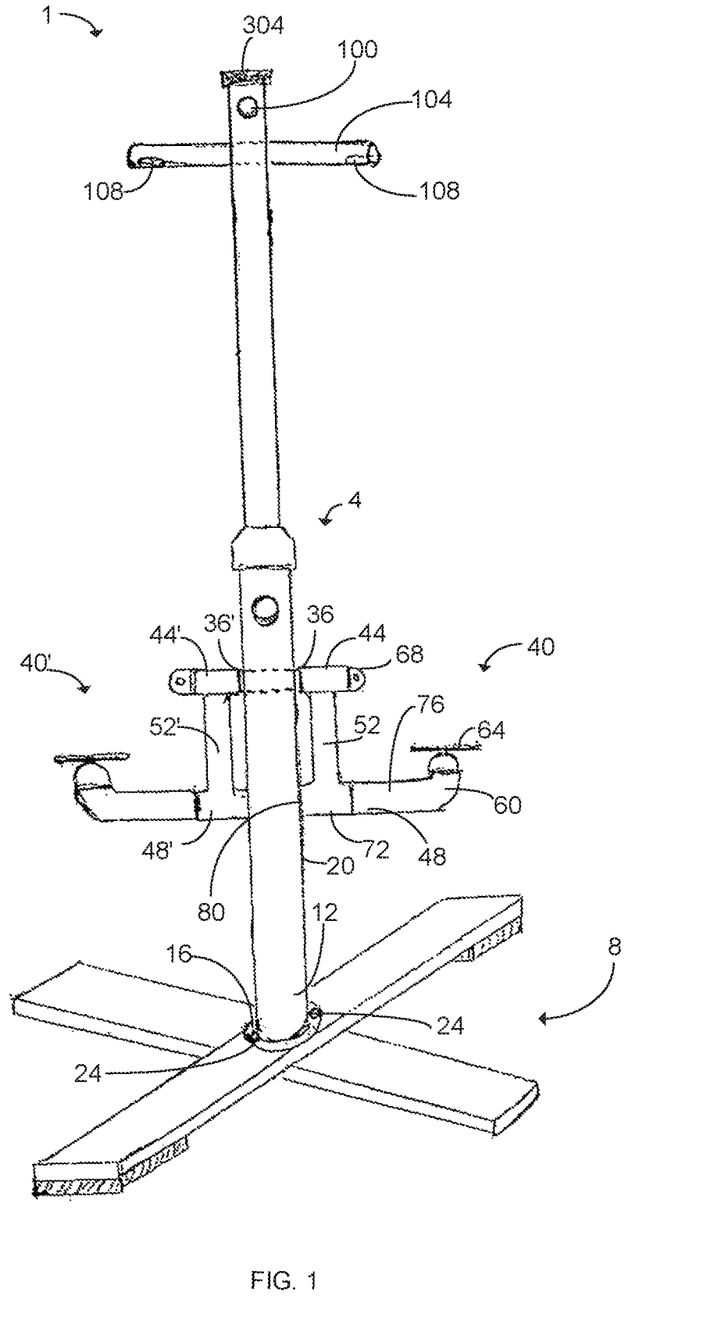
FIG. 1 illustrates an elevation view of a pot-displaying apparatus according to one exemplary embodiment.
Figure 2:
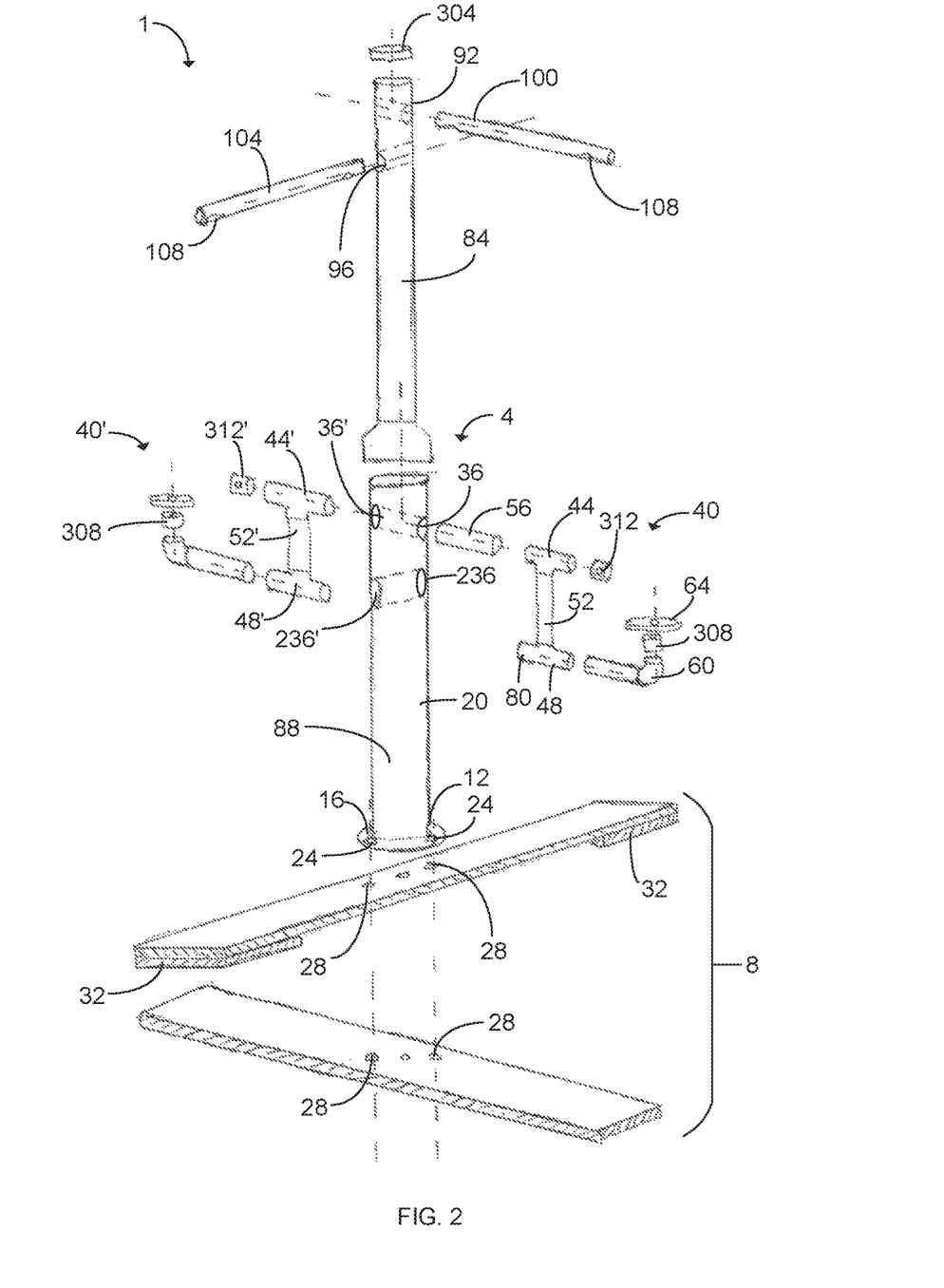
FIG. 2 illustrates an exploded view of the exemplary pot-displaying apparatus.

Referring now to FIGS. 1 and 2 simultaneously, therein illustrated is a side elevation view and an exploded view, respectively, of an item-displaying apparatus 1 according to an exemplary embodiment. The item-displaying apparatus 1 includes a post member 4, which may be supported by a base 8.

A bottom portion 12 of the post member 4 is adapted to be coupled to the base 8. When appropriately coupled, the post member 4 retains a substantially upright position, as illustrated in FIG. 1.

The post member 4 may be coupled to the base 8 to be freely rotatable in its upright position. Alternatively, the post member 4 is in a fixed position when coupled to the base 8.

For example, and as illustrated, the bottom portion 12 of the post member 4 includes a flange 16 extending outwardly from a sidewall 20 of the post member 4. The flange 16 may be bonded to the bottom end 12 of the post member 4 using a suitable adhesive.

For example, and as illustrated, the flange 16 may have formed therein one or more openings 24. The base 8 may also have formed therein one or more openings 28 that correspond to openings 24 of the flange 16. Accordingly, the post member 4 can be coupled to the base 8 using fasteners, such as screws, nuts and bolts, and/or ties, extending through the openings 24 and openings 28.

For example, and as illustrated, the base 8 may be formed of elongated boards arranged in a cross. The elongated boards may be formed of any suitable material, such as wood, such as plywood. When arranged in a cross, an upper board may have feet 32 to ensure stability of the base. For example, the base may include two elongated plywood boards each having a dimension of approximately 1.25 inches by approximately 7 inches by approximately 36 inches.

Continuing with FIGS. 1 and 2, the post member 4 includes at least one opening 36 formed in the sidewall 20 of the post member 4. The at least one opening may be formed by drilling through the sidewall 20 of the post member 4.

The item-displaying apparatus 1 further includes at least one item-supporting frame 40. A item-supporting frame 40 includes a first branch member 44 and a second branch member 48. A linking member 52 extends between the first branch member 44 and the second branch member 48. For example, and as illustrated, the first branch member 44 and the second branch member 48 may be arranged parallel to one another and the linking member 52 extends transversely between them. The linking member 52 may be perpendicular to the first branch member 44 and the second branch member 48.

According to various exemplary embodiments, the first branch member 44, the second branch member 48 and the linking member 52 may be integrally formed.

According to various exemplary embodiments, the first branch member 44, the second branch member 48 and the linking member 52 are discrete parts that are bonded together using a suitable adhesive.

The first branch member 44 is adapted to be inserted into the at least one opening 36. For example, the diameter of the opening 36 is sized to correspond to an outer diameter of the first branch member 44 such that the first branch member 44 fits snugly within the opening 36. Alternatively, the first branch member 44 is inserted into the at least one opening 36 via a connector 56. The connector 56 engages a portion of the first branch member 44 and is further inserted into the one opening 36, thereby retaining the first branch member 44 within the opening 36.

According to various exemplary embodiments, the first branch member 44 may be surrounded by a deformable foam to promote retention of the first branch member 44 within the opening 36.

According to various exemplary embodiments, the first branch member 44 may be retained within the opening 36 without use of adhesives.

For example, the first branch member 44 may be removed after being inserted into the opening 36.

A first portion of the second branch member 48 includes an item holder for holding an item, such as a flower pot or plant pot. For example, and as illustrated, the item holder includes an elbow joint 60 and a item holding plate 64. As illustrated, the second branch member 48 may be formed of an inner portion 72 and outer portion 76. The inner portion 72 is joined to the first branch member 4 via the linking member 52. The outer portion 76 includes the item holder.

According to various exemplary embodiments, the second branch member 48 extends past an outer portion 68 of the first branch member 44 such that the item holder of the second branch member 48 is located at a distance from the post member 4 that is greater than a distance of the outer portion 68 from the post member 4.

When a force is applied on the item holder of the second branch member 48, a second portion 80 of the second branch member engages the sidewall 20 of the post member 4. For example, the second branch member 48 is urged towards the sidewall 20 such that the second portion 80 abuts against the sidewall 20. This abutment causes the second portion 80 to frictionally engage the sidewall 20, thereby retaining the item supporting frame 40 in place.

When the post member 4 is in its upright position, as illustrated in FIG. 1, the first branch member 44 is positioned at a height along the post member 4 that is higher than the height of the second branch member 48. The first branch member 44 is also positioned at a height that is higher than the height of the item holder of the second branch member 48. Both the first branch member 44 and the second branch member 48 are oriented substantially horizontally with respect to an underlying plane supporting the item displaying apparatus 1. The linking member 52 is oriented substantially vertically. Accordingly, the elbow joint 60 of the second branch member 48 has a vertically extending portion that supports the item holding plate 64. Accordingly, the item holding plate 64 presents a substantially horizontal surface upon which an item can sit.

When an item, such as a flower pot or plant pot, is placed upon the pot holder of the second branch member 48, a downward force is applied onto the first portion of the second branch member 48 due to gravity. Furthermore, the joint of the first branch member 44 and the linking member 52 acts as a pivot point when this downward force is applied. Therefore, the downward force applied onto the first portion of the second branch member 48 causes a dominantly horizontal force to be applied on to the second portion 80 of the second branch member 48. This dominantly horizontal force causes frictional engagement of the second branch member 48 with the post member 4. Accordingly, the second branch member 48 abuts an exterior vertical surface of the sidewall 20.

It will be understood that "a dominantly horizontal force" means a force having a component in the horizontal direction that is substantially greater than its component in the vertical direction. For example, the force in the horizontal direction is at least 1.5 times the force in the vertical direction. For example, the force in the horizontal direction is at least 2 times the force in the vertical direction. For example, the force in the horizontal direction is at least 3 times the force in the vertical direction.

According to various exemplary embodiments, and as illustrated in FIGS. 1 and 2, the item-displaying apparatus 1 includes opposing openings 36 and 36' formed in the sidewall 20 of the post member 4. For example, the openings 36 and 36' may be formed by drilling a channel through the post member 4. Accordingly, a first item supporting frame 40 and a second item supporting frame 40' are respectively inserted into a first opening 36 of the opposing openings and a second opening 36' of the opposing openings. The connector 56 may extend between the opposing openings 36 and 36' and connect to both the first branch member 44 of the first item supporting frame 40 and the first branch member 44' of the second item supporting frame 40'. As a result, the first supporting frame 40 and the second supporting frame 40' are positioned opposite one another and on either side of the post member 4. The oppositely positioned supporting frames 40 and 40' therefore present two item holders for placing items, such as flower or plant pots. Furthermore, the oppositely positioned supporting frames 40 and 40' may contribute to a better weight balance of the item-displaying apparatus 1.

According to various exemplary embodiments, the post member 4 of the item-displaying apparatus 1 includes a plurality of subsections connected end to end. According to the example illustrated in FIGS. 1 and 2, the post member 4 includes an upper subsection 84 and a lower subsection 88.

Each of the upper subsection 84 and the lower subsection 88 has at least one opening formed therein for receiving item-supporting frames.

For example, and as illustrated, the upper subsection 84 has perpendicularly oriented throughholes 92 and 96 that have inserted therein rods 100 and 104 respectively. The rods 100 and 104 are adapted to support hanging planters. In some exemplary embodiments, the rods 100 and 104 may be hollow and have one or more openings 108 formed on the underside of the rods 100, 104 for receiving hooks of the hanging planters.

For example, and as illustrated, the lower subsection 88 has the opposing openings 36 and 36' that have inserted therein the item-supporting frames 40 and 40' as described elsewhere herein.

Figure 3:
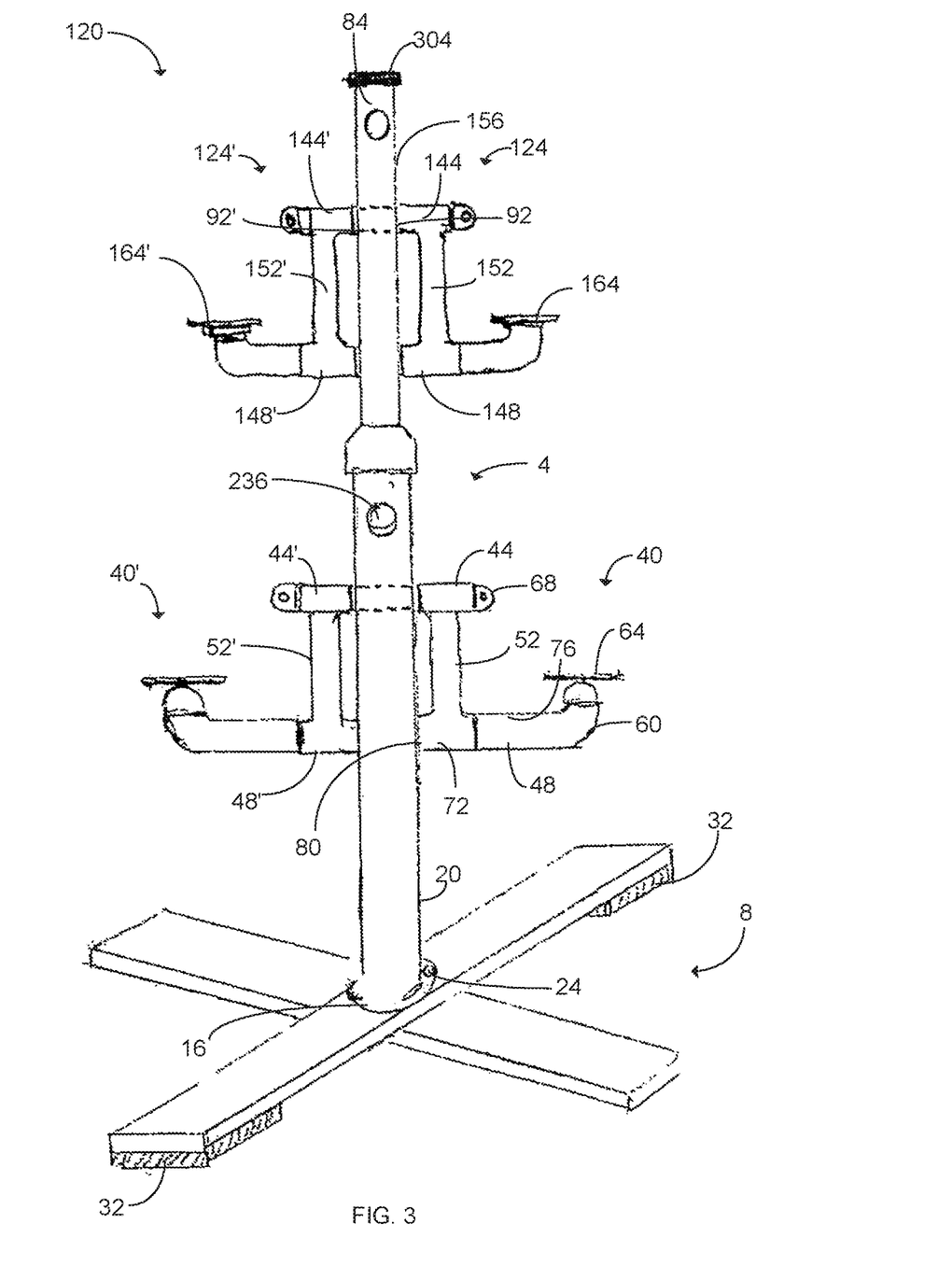
FIG. 3 illustrates an elevation view of a pot-displaying apparatus according to a first alternative exemplary embodiment.
Figure 4:
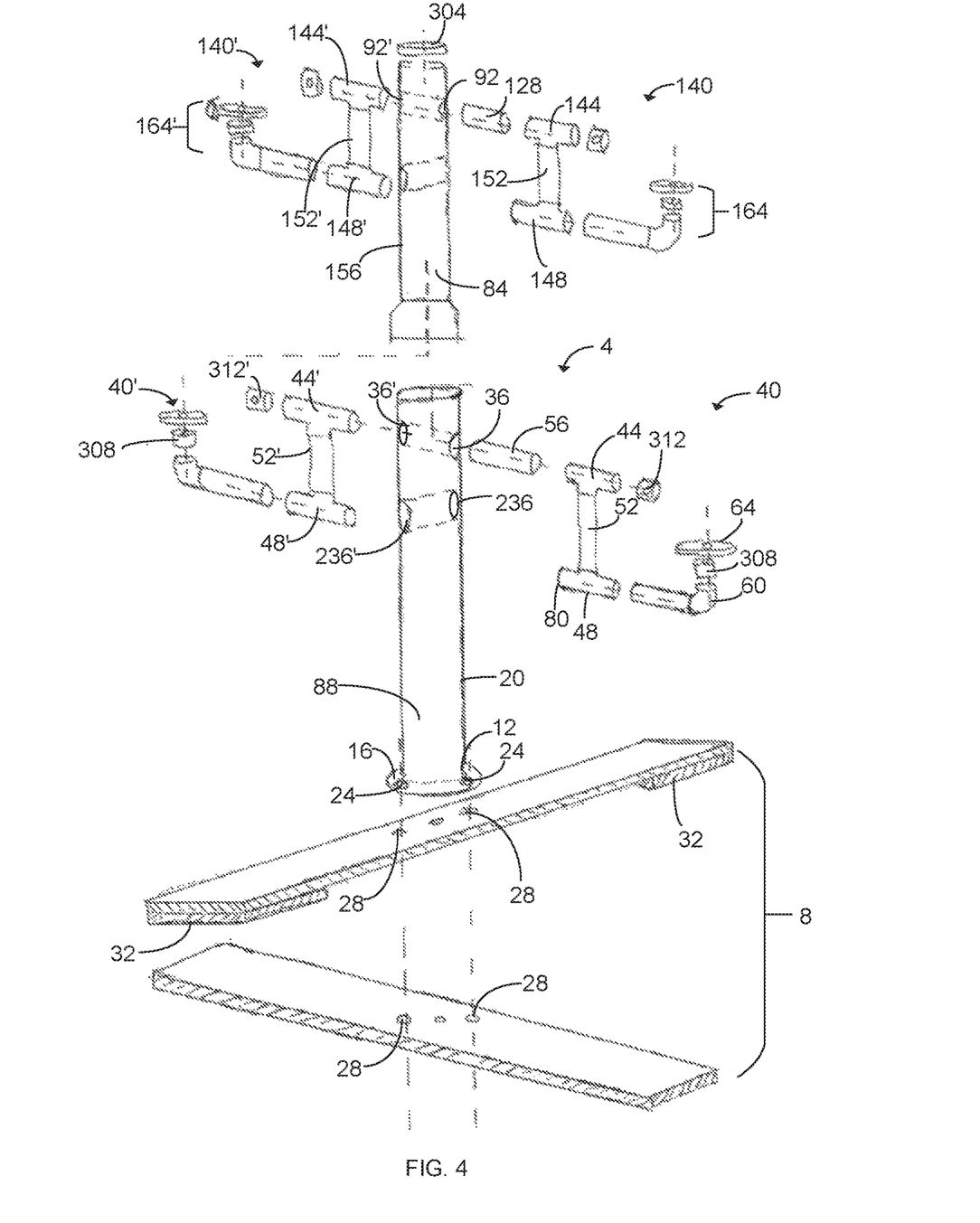
FIG. 4 illustrates an exploded view of the pot-displaying apparatus according to the first alternative exemplary embodiment.

Referring now to FIGS. 3 and 4 simultaneously, therein illustrated is a side elevation view and an exploded view, respectively, of an item-displaying apparatus 120 according to an alternative exemplary embodiment.

The lower subsection 88 of the alternative item-displaying apparatus 120 has opposing openings 36 and 36' that have inserted therein the item-supporting frames 40 and 40' as described elsewhere herein.

The upper subsection 84 of the alternative item-displaying apparatus has opposing openings 92 and 92' that have inserted therein item-supporting frames 124 and 124' that have functional characteristics corresponding to those of the item-supporting frames 40 and 40'.

For example, the item-supporting frames 124 and 124' each have a first branch member 144 (144') and second branch member 148 (148') and a linking member 152 (152') that extends between the first branch member 144 and the second branch member 148. The first branch members 144 of the item-supporting frames 124, 124' are inserted into opposing openings 92 and 92' and may be connected by a suitable connector 128. When a force is applied on either one of the item holders 164, 164', a corresponding second branch member 148 or 148' is urged horizontally to engage the sidewall 156 of the upper subsection 84. For example, the second branch member 148 or 148' and/or the linking member 152 or 152' can be flexible thereby facilitating removable engagement with the sidewall 156.

It will be appreciated that in comparison to the item-displaying apparatus 1 illustrated in FIGS. 1 and 2, the alternative item-displaying apparatus 1 presents four item-holding surfaces for supporting items, such as flower or plant pots.

The item holders 164, 164' of the upper subsection 84 are illustrated to be closer to the post member 4 than the item holding plates 64 and 64' of the lower subsection 88. However, it will be understood that in other exemplary embodiments, the item holders 164 and 164' may be of equal distance or greater distance from the post member 4 than the item holding plates 64 and 64' of the lower subsection 88.

The item-supporting frames 124 and 124' of the upper subsection 84 are illustrated to be parallel to the item-supporting frames 40 and 40' of the lower subsection 88. However it will be understood that in other exemplary embodiments, the item-supporting frames 124 and 124' may be oriented differently from the item-supporting frames 40 and 40' of the lower subsection 88. In one exemplary embodiment, the item-supporting frames 124 and 124' are oriented perpendicularly to the item-supporting frames 40 and 40' of the lower subsection 88.

Figure 5:
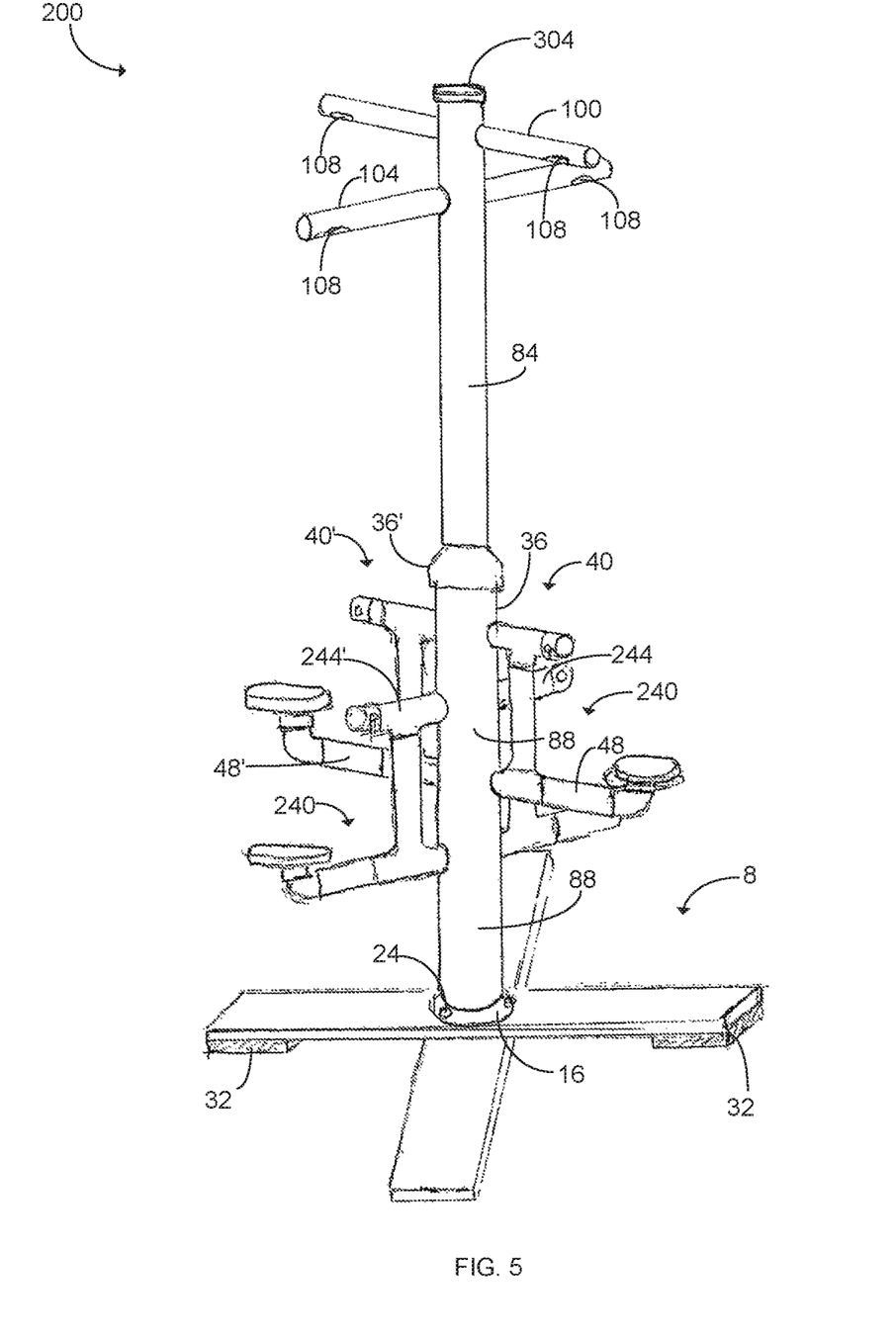
FIG. 5 illustrates a perspective view of a pot-displaying apparatus according to a second alternative exemplary embodiment.

Referring now to FIG. 5, therein illustrated is a perspective view of an item-displaying apparatus 200 according to a second alternative embodiment. The item displaying apparatus 200 includes a first opening formed at a first length along one of its post member subsections and a second opening formed at a different length along the same post member subsection. Furthermore, item supporting frames are inserted into each of the openings such that item supporting frames are positioned at different heights along the post member subsection.

As illustrated in FIG. 5, a first pair of oppositely positioned item-supporting frames 40 and 40' are inserted into a first pair of opposing openings 36 and 36' of the lower subsection 88 of the post member 4 as described herein with reference to FIGS. 1 and 2.

Furthermore, a second pair of oppositely positioned item-supporting frames 240 and 240' are inserted into a second pair of opposing openings 236 and 236' of the same lower subsection 88. The second pair of opposing openings 236 and 236' and are positioned at a height that is below the height of the first pair of opposing openings 36 and 36'. Accordingly, the second pair of oppositely positioned item-supporting frames 240 and 240' are also positioned below the first pair of oppositely positioned item-supporting frames 40 and 40'.

According to various exemplary embodiments, the second pair of opposing openings 236 and 236' are oriented differently from the first pair of opposing openings 36 and 36'. Accordingly, the second pair of oppositely positioned item-supporting frames 240 and 240' are also oriented differently from the first pair of oppositely positioned item-supporting frames 40 and 40'. For example, the second pair of oppositely positioned item-supporting frames 240 and 240' may be oriented perpendicularly to the first pair of oppositely positioned item-supporting frames 40 and 40'.

According to various exemplary embodiments, and as illustrated in FIG. 5, the second pair of opposing openings 236 and 236' are slightly staggered in height with respect to the first pair of opposing openings 36 and 36'. For example, the second pair of opposing openings 236 and 236' are positioned below the first pair of opposing openings 36 and 36' but above the height of the second branch members 48 and 48' of the first pair of oppositely positioned item supporting frames 40 and 40'. Accordingly, the first branch members 244 and 244' of the second pair of oppositely positioned item supporting frames 240 and 240' are positioned at a height between the first branch members 44, 44' and the second branch members 48, 48' of the first pair of oppositely positioned item supporting frames 40 and 40'.

This exemplary arrangement of the item supporting frames 40, 40', 240 and 240' provides an aesthetically pleasing intertwined look to the branch members of the supporting frames of the lower subsection 88 of the post member 4. Furthermore, this exemplary arrangement allows a plurality of item holders (four item holders in the example of FIG. 5) to be placed in close vicinity of one another. Furthermore, the staggered height of the first pair of supporting frames 40 and 40' relative to the second pair of supporting frames 240 and 240' still allow the item-supporting frames 40 and 40' to be connected together with the connector 56 extending between the openings 36 and 36' while also allowing the item-supporting frames 240 and 240' and to be connected together with another connector extending between the openings 236 and 236'. This exemplary arrangement further ensures symmetry of the item-displaying apparatus 200, thereby providing good weight balance when flower or plant items are placed on the item holders of the item-supporting frames 40, 40', 240 and 240'.

Figure 6:
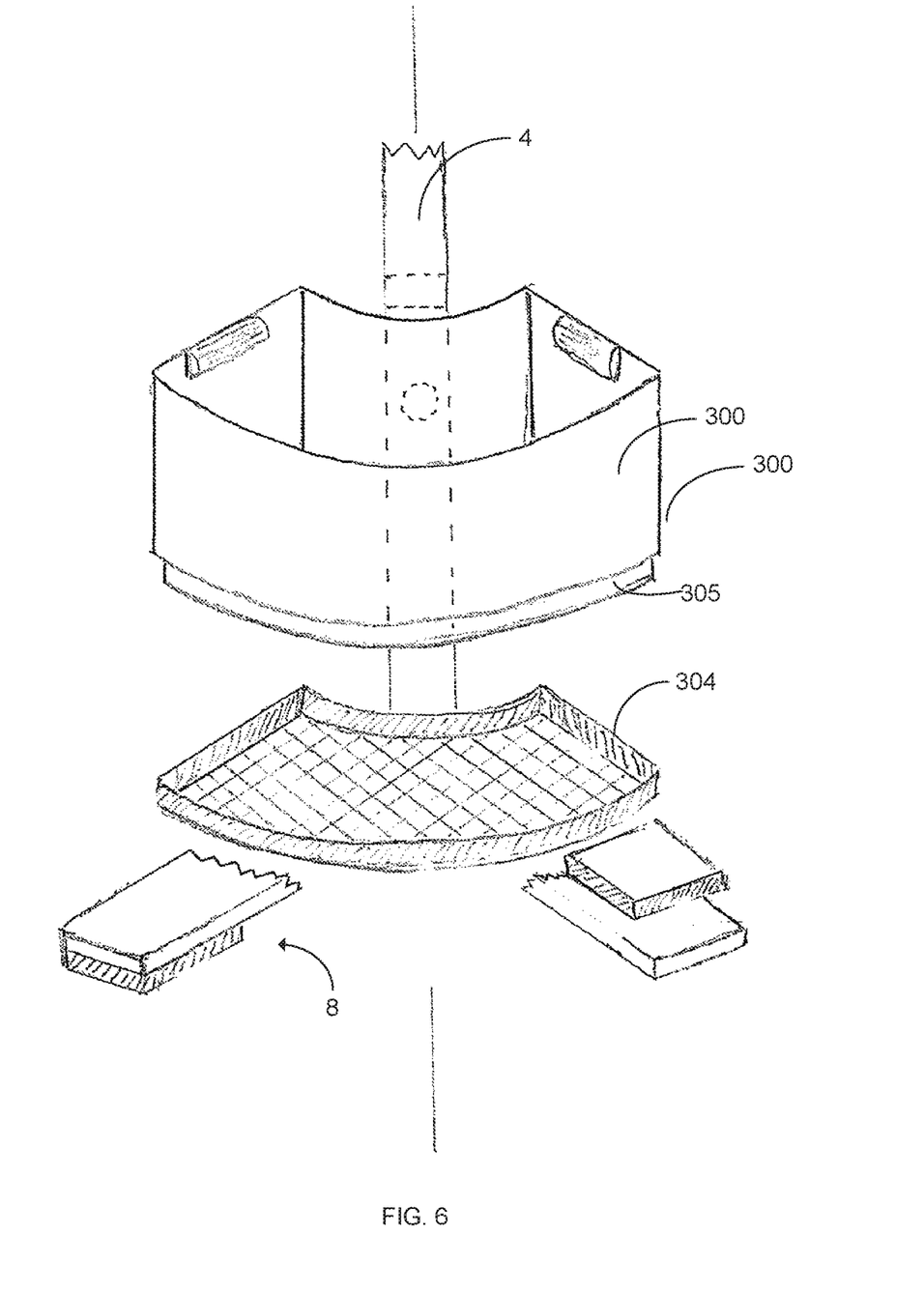
FIG. 6 illustrates a close-up view of a base portion of the pot-displaying apparatus according to various exemplary embodiments.

Referring now to FIG. 6, therein illustrated is a perspective close-up view of a base portion of the item-displaying apparatus 1. A bin 300 and a sub-bin 304 are provided proximate the base 8 of the item-displaying apparatus 1. The bin 300 and sub-bin 304 may be used to collect debris falling from flowers or plants placed in item holders above. Alternatively, the bin 300 may be used as a pot for cultivating additional flowers and/or plants. The bin 300 extends angularly about the post member 4.

According to some exemplary embodiments, the sub-bin—304 is supported by the base 8 and the bin 300 is disposed within the sub-bin 304. For example, and as illustrated, a bottom of the bin 300 may have a notch 305 that cooperates with sidewalls of the sub-bin 304 so that the bin 300 is retained within the sub-bin 304.

Alternatively, the bin 300 may be positioned at an elevated position above the base 8 by fixing the bin 300 to an additional opening in the post member 4. The sub-bin 304 may be supported by the base 8.

For example, and as illustrated, the bin 300 and sub-bin 304 may extend about the post member 4 to form a quarter circle. However, it will be understood that in other exemplary embodiments, the bin 300 and sub-bin 304 may have any other suitable shape and/or angular width. In some embodiments, more than one bin 300 and sub-bin 304 may be provided. For example, two bins 300 and two sub-bins 304 may be provided to form a semi-circle. For example, three bins 300 and three sub-bins 304 may be provided to form a three-quarter circle. For example, opposing bins may be provided (not shown) for better weight balance of the item-displaying apparatus.

According to various exemplary embodiments, various components of the item displaying apparatus 1, 120 and/or 200 may be formed of non-metallic materials.

According to various exemplary embodiments, various components of the item displaying apparatus 1, 120 and/or 200 may be formed of recycled materials. It will be understood that recycled materials herein refers to materials that was previously used for another purpose but have been repurposed for use within the item-displaying apparatus.

For example, various components of the item displaying apparatus 1, 120 and/or 200 may be formed of building pipes and accessories, such as recycled building pipes and accessories. For example, the building pipes may be formed of ABS (acrylonitrile butadiene styrene), PVC (polyvinyl chloride), metal and plastic. The recycled building pipes and accessories may have previously been used within a commercial or residential building but are now repurposed for use within the item-displaying apparatus.

For example, the post member 4 may be formed of one or more building pipes (ex: recycled building pipes) of the same or different diameters. For example, a pipe having a larger diameter is used for the lower subsection 88 than the pipe used for the upper subsection 84. The lower subsection 88 may be an ABS pipe having a diameter of approximately 3 inches. The lower subsection 88 may be a standard ABS pipe section having the diameter of approximately 3 inches and a length of approximately 36 inches. The upper subsection 84 may be an ABS pipe having a diameter of approximately 2 inches. The upper subsection 84 may be a standard ABS pipe section having the diameter of approximately 2 inches and a length of approximately 36 inches. Openings 36, 36', 90, 90', 92, 92', 236 and 236' and any other openings may be formed in the ABS pipe prior to assembly of the item-displaying apparatus. An adapter may be used to connect the upper subsection 84 and lower subsection 88 of different diameters. A pipe plug 304 may be used to plug a top opening of the post member 4.

For example, portions of the item-supporting frames 40, 40', 124, 124', 240, and 240' may be building pipes (ex: recycled building pipes) of the same or different diameters. The first branch members 44, 44', 144, 144', 244 and 244' may be ABS pipe sections having a diameter of approximately 1.5 inches. Approximately 1.5 inch diameter ABS plugs 312, 312' may be used to plug end openings of the first branch members.

ABS plugs 312, 312' may be perforated to define an opening. A supporting string or rope may be passed at one end through opening and tied at another end to an upper portion of the post member 4. The use of the string or rope tied in this manner can further promote stability of the item-supporting frames. For example, the string or rope may be elastic.

Similarly, the second branch members 48, 48', 148, 148', 248, 248' may be ABS pipe sections having a diameter of approximately 1.5 inches. Approximately 1.5 inch diameter ABS elbows may also be used for the item holder of the second branch members. An approximately 1.5 inch diameter ABS plug 308 may also be provided to plug a top opening of the elbow. The first branch member may be glued to its corresponding second branch member prior to assembly of the item-displaying apparatus.

Furthermore, the connector 56 or other connectors for connecting opposing first branch members may also be an ABS pipe section having a diameter of approximately 1.5 inches. The connector may be a pipe section having the approximately 1.5 inch diameter and approximately 5.5 inch length.

For example, the rods 100, 104 may be building pipes (ex: recycled building pipes) of the same of different diameters. The rods 100, 104 may be ABS pipe sections having a diameter of approximately 1.5 inches. For example, the rods 100, 104 as ABS pipe sections may have a length of approximately 5.5 inches. The openings 108 may be formed by drilling the ABS pipe sections prior to assembly of the item-displaying apparatus.

For example, the bin 300 and sub-bin 304 may be formed of a recycled plastic.

According to various exemplary embodiments, at least 50% of the item-displaying apparatus is formed of recycled material.

According to various exemplary embodiments, at least 70% of the item-displaying apparatus is formed of recycled material.

According to various exemplary embodiments, at least 90% of the item-displaying apparatus is formed of recycled material.

Components of the item-displaying apparatus described herein according to various exemplary embodiments may be provided disassembled within a kit. For example, the kit would include at least the post member 4 and at least one item-supporting frame 40. The post member 4 is provided within the kit having an already preformed opening 36 that has a diameter corresponding to the first branch member 44 of the item-supporting frame 40 The item-displaying apparatus can then be assembled by coupling the post member 4 to a suitable base 8 and inserting the item-supporting frame 40 into the opening 36 already preformed in the post member 4.

The item-displaying apparatus can be expanded upon by acquiring additional components, such as the base 8, one or more additional subsections (ex: upper subsection 84 or lower subsection 88), item-supporting rods 100 and/or 104, additional item-supporting frames, one or more bins 300 and/or one or more sub-bins 304.

In other exemplary embodiments, one or more of the base 8, one or more additional subsections (ex: upper subsection 84 or lower subsection 88), item-supporting rods 100 and/or 104, additional item-supporting frames, one or more bins 300 and/or one or more sub-bins 304 may be provided within the kit.

For example, the post member 4 is provided with opposing openings 36 and 36' and the kit includes at least two item-supporting frames 40.

It will be appreciated that item-displaying apparatus and kits described herein provide great modularity in creating a suitable item-displaying apparatus. For example, the height of the item-displaying apparatus 1 can be varied by using different numbers of subsections 84, 88 or subsections 84, 88 of different lengths. Alternatively, or additionally, the number and/or types of items that can be displayed can be varied by using different types and/or numbers of item holders (ex: item-supporting frames 40 or rods 100). The item holders may further have different properties such as height (ex: length of linking member 52) or width (ex: distance between item holder and second portion of the second branch member or length of rods 100).

It will be understood that item-displaying apparatuses and kits described herein may be used to display various types of items other than flower or plant pots. For example, items that can be displayed may include products for sale or presentation, such as in a retail or exhibition space. Other items may include works for arts and crafts, etc.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The invention claimed is:

1. An item-displaying apparatus comprising:
a post member having at least two opposing openings formed in a sidewall thereof;
at least two item supporting frames, each item supporting frame comprising:
a first branch member received within one of the at least two opposing openings;
a second branch member having an item holder at a first portion of the second branch; and
a linking member extending between the first branch member and the second branch member, wherein the at least two item supporting frames comprise a first item supporting frame inserted into a first of the at least two opposing openings and a second item supporting frame inserted into a second of the at least two opposing openings; and
a connector extending through the post member between the first of the at least two opposing openings and the second of the at least two opposing openings and connecting the first item supporting frame and the second item supporting frame, wherein when a downward force is applied on the item holder, a second portion of the second branch member engages the sidewall of the post member, and wherein when the post member is in an upright position, the first branch member is positioned at a height along the post member above a height of the item holder of the second branch, the first branch member and second branch member are oriented substantially horizontally and the linking member is oriented substantially vertically.

2. The apparatus according to claim 1, wherein the second portion of the second branch member abuts the sidewall of the post member to engage it.

3. The apparatus according claim 1, wherein the at least two opposing openings comprise a first pair of opposing openings in the sidewall and a second pair of opposing openings in the sidewall oriented different from the first pair of opposite openings; and wherein the at least two item-supporting frames comprise a first pair of oppositely positioned item-supporting frames being received in the first pair of opposing openings and a second pair of oppositely positioned item-supporting frames being received in the second pair of opposing openings.

4. The apparatus according to claim 3, wherein the second pair of oppositely positioned item-supporting frames are oriented perpendicularly to the first pair of oppositely positioned item-supporting frames.

5. The apparatus according to claim 1, wherein the second portion of the second branch member abuts an exterior vertical surface of the sidewall of the post member to engage it.

6. The apparatus according to claim 1, wherein the downward force applied on the item holder causes a dominantly horizontal force to be applied on the second branch member, thereby causing engagement of the second branch member with the sidewall of the post member.

7. The apparatus according to claim 6, wherein the dominantly horizontal force on the second branch member causes frictional engagement of the second portion of the second branch member with the sidewall of the post member.

8. The apparatus according to claim 1, wherein the item holder of the second branch member comprises an elbow joint having a vertically extending portion and an item holding plate supported by the vertically extending portion.

9. The apparatus according claim 1, wherein the at least two opposing openings comprise a first opening formed at a first height along the post member and a second opening formed at a second height along the post member, the first height being different from the second height; and wherein an item supporting frame is received in each of the first opening and the second opening.

10. The apparatus according to claim 1, wherein the at least two openings comprise a first pair of opposing openings in the sidewall and a second pair of opposing openings in the sidewall oriented different from the first pair of opposite openings and positioned at a height below a height of the first pair of opposite openings; and wherein the at least two item-supporting frames comprise a first pair of oppositely positioned item-supporting frames being received in the first pair of opposing openings and a second pair of oppositely positioned item-supporting frames being received in the second pair of opposing openings, the second pair of oppositely positioned item-supporting frames being positioned at a height below a height of the first pair of oppositely positioned item-supporting frames.

11. The apparatus according to claim 1, wherein the post member, the first branch member and the second branch member are formed of building pipes.

12. The apparatus according to claim 11, wherein the building pipes are formed of at least one of PVC, ABS, plastic and metal.

13. An item displaying kit comprising:
a post member having at least two opposing openings formed in a sidewall thereof;
at least two item supporting frames, each item supporting frame comprising:
a first branch member adapted to be inserted within one of the said at least two opposing openings;
a second branch member having an item holder at a first portion of the second branch; and
a linking member adapted to extend between the first branch member and the second branch member, wherein the at least two item supporting frames comprise a first item supporting frame adapted to be inserted into a first of the opposing openings and a second item supporting frame adapted to be inserted into a second of the opposing openings; and
a connector adapted to extend through the post member between the first of the at least two opposing openings and the second of the at least two opposing openings and to connect the first item supporting frame and the second item supporting frame,
wherein when the first branch member is inserted into the at least one opening and a downward force is applied on the item holder, a second portion of the second branch member engages the sidewall of the post member,
and wherein when the post member is in an upright position, the first branch member is positioned at a height along the post member above a height of the item holder of the second branch, the first branch member and second branch member are oriented substantially horizontally and the linking member is oriented substantially vertically.

* * * * *